United States Patent
Demott et al.

(10) Patent No.: US 11,685,687 B2
(45) Date of Patent: Jun. 27, 2023

(54) MINERAL WOOL

(71) Applicant: KNAUF INSULATION SPRL, Visé (BE)

(72) Inventors: Gerard Demott, Majcichov (SK); Mitja Oresnik, Radomlje (SI)

(73) Assignee: Knauf Insulation SPRL, Vise (BE)

( * ) Notice: Subject to any disclaimer, the term of this patent is extended or adjusted under 35 U.S.C. 154(b) by 0 days.

(21) Appl. No.: 17/348,691

(22) Filed: Jun. 15, 2021

(65) Prior Publication Data

US 2021/0309563 A1 Oct. 7, 2021

Related U.S. Application Data

(63) Continuation of application No. 16/488,276, filed as application No. PCT/EP2018/054579 on Feb. 23, 2018, now Pat. No. 11,192,819.

(30) Foreign Application Priority Data

Feb. 24, 2017 (GB) ..................................... 1703057

(51) Int. Cl.
| | |
|---|---|
| C03C 13/06 | (2006.01) |
| C03C 3/087 | (2006.01) |
| C03C 1/00 | (2006.01) |
| C03C 3/089 | (2006.01) |

(52) U.S. Cl.
CPC .............. C03C 13/06 (2013.01); C03C 3/087 (2013.01); *C03C 1/002* (2013.01); *C03C 3/089* (2013.01)

(58) Field of Classification Search
CPC ......... C03C 13/06; C03C 1/002; C03C 3/087; C03C 3/089; C03C 3/097
See application file for complete search history.

(56) References Cited

U.S. PATENT DOCUMENTS

| | | |
|---|---|---|
| 5,198,190 A | 3/1993 | Philipp et al. |
| 6,284,684 B1 | 9/2001 | Vignesoult et al. |
| 6,698,245 B1 * | 3/2004 | Christensen ............ C03C 1/002 65/121 |
| 9,957,191 B2 | 5/2018 | Li et al. |
| 11,192,819 B2 * | 12/2021 | Demott .................. C03C 3/097 |
| 2013/0165553 A1 | 6/2013 | Cuypers et al. |

FOREIGN PATENT DOCUMENTS

| | | |
|---|---|---|
| WO | 9815503 | 4/1998 |
| WO | 2012141467 | 10/2012 |
| WO | 2014171562 | 10/2014 |

OTHER PUBLICATIONS

Office action for co-pending U.S. Appl. No. 16/488,276 (16 pages)—dated Oct. 23, 2020.
International Search Report for PCT/EP2018/054579, completed May 25, 2018.
Written Opinion of International Searching Authorily for PCT/EP2018/054579, completed May 25, 2018.

* cited by examiner

*Primary Examiner* — Karl E Group
*Assistant Examiner* — Cameron K Miller
(74) *Attorney, Agent, or Firm* — Knauf Insulation, Inc.; James K. Blodgett

(57) ABSTRACT

Mineral wool fibers having a mineral wool fiber composition are manufactured by introducing batch materials into a melter, melting the mineral batch materials in the melter to provide a melt and fiberizing the melt to form the mineral wool fibers. The batch materials comprise i) fibers having a first batch material composition which is different from the mineral wool fiber composition and consisting of scrap fibers which have broken at a bushing producing continuous fibers; and ii) one or more additional mineral batch materials.

18 Claims, No Drawings

MINERAL WOOL

CROSS-REFERENCE TO RELATED APPLICATIONS

This application is a continuation of U.S. application Ser. No. 16/488,276, filed Aug. 23, 2019, which a U.S. national counterpart application of International Application Serial No. PCT/EP2018/054579, filed Feb. 23, 2018, under 35 U.S.C. § 371, which claims priority to GB Application Serial No. 1703057.8, filed Feb. 24, 2017, the disclosures of which are hereby incorporated herein by reference.

FIELD OF THE INVENTION

The present invention relates to mineral wool and particularly to advantageous combinations of raw materials for manufacturing mineral wool.

BACKGROUND

Manufacturing mineral wool requires simultaneously satisfying a plurality of often conflicting requirements. The chemical composition of mineral wool fibers must satisfy requirements including physical strength, resistance to humidity, bio-solubility, compatibility with manufacturing techniques and insusceptibility to variations in manufacturing tolerances whilst the raw materials used for producing the mineral fibers must satisfy requirements including availability in a form compatible with manufacturing techniques, security of supply and consistency of composition. Raw materials used for the manufacture of stone wool fibers may be selected from basalt, gabbro, dolomite, calcined alumina and recycled materials including stone wool fibers and slag. Raw material used for the manufacture of glass wool fibers may be selected from silica sand, feldspar, nepheline syenite, aplite, calcined alumina, hydrated alumina, soda-ash, limestone, dolomite, magnesite, recycled glass bottles, recycled glass sheets, borax pentahydrate, borax decahydrate and anhydrous borax.

SUMMARY

According to one aspect, the present invention provides a method of making mineral wool fibers as defined in claim 1. The dependent claims define preferred or alternative embodiments.

DETAILED DESCRIPTION

The inventors have determined that mineral wool fibers having a chemical composition comprising:
a) 30 to 55 wt % $SiO_2$, and
10 to 30 wt % $Al_2O_3$, and
4 to 14 wt % total iron expressed as $Fe_2O_3$, and
20 to 35 wt % of the combination of CaO and MgO, and
less than 8 wt % of the combination of $Na_2O$ and $K_2O$, and preferably
an alkali/alkaline-earth ratio which is <1
or
b) 30 to 55 wt % $SiO_2$, notably 39 to 52 wt %; $SiO_2$ and
10 to 30 wt % $Al_2O_3$, notably 16 to 26 wt % $Al_2O_3$ and
4 to 14 wt % total iron expressed as $Fe_2O_3$, and
8 to 23 wt % of the combination of CaO and MgO, and
4 to 24 wt % of the combination of $Na_2O$ and $K_2O$; and preferably
an alkali/alkaline-earth ratio which is <1
may be manufactured using raw materials which comprise a first batch material comprising
52 to 68 wt % $SiO_2$, notably 52 to 62 wt % $SiO_2$, and
12 to 30 wt % $Al_2O_3$, notably 12 to 16 wt % $Al_2O_3$, and
0 to 25 wt % CaO, notably 16 to 25 wt % CaO, and
0 to 12 wt % MgO, notably 0 to 5 wt % and
0 to 10 wt % $B_2O_3$, notably 0 to 2 wt % $B_2O_3$, and
0 to 2 wt % of the combination of $Li_2O+Na_2O+K_2O$, and
0 to 1.5 wt % $TiO_2$, and
0.005 to 1 wt % total iron expressed as $Fe_2O_3$, and
0 to 1 wt % fluoride
whilst satisfying the complex combination of requirements for manufacture of the mineral wool fibers and their raw materials.

The term wt % as used herein signifies weight %.

The quantity of $SiO_2$ in the mineral wool fibers may be ≥35 wt % or ≥38 wt % and/or ≤50 wt %, or ≤45 wt %. The quantity of $Al_2O_3$ in the mineral wool fibers may be ≥12 wt % or ≥15 wt % and/or ≤25 wt % or ≤20 wt %. The total iron content expressed as $Fe_2O_3$ in the mineral wool fibers may be ≥5 wt % or ≥6 wt % and/or ≤13 wt %, ≤12 wt % or ≤10 wt %. In one case, the quantity of the combination of CaO and MgO in the mineral wool fibers is 20 to 35 wt % and may be ≥25 wt % and/or ≤30 wt % and the quantity of the combination of $Na_2O$ and $K_2O$ in the mineral wool fibers is less than 8 wt % and may be ≥1 wt % or ≥2 wt % or ≥4 wt % and/or ≤5 wt % or ≤4 wt %. In another case, the quantity of the combination of CaO and MgO in the mineral wool fibers may is between 8 to 23 wt % and may be ≥10 wt %, ≥12 wt % or ≥15 wt % and/or ≤22 wt % or ≤20 wt % or ≤18 wt % and the quantity of the combination of $Na_2O$ and $K_2O$ in the mineral wool fibers is between 4 to 24 wt % and may be ≥5 wt % or ≥6 wt % and/or ≤12 wt % or ≤10 wt %. The ratio of alkali/alkaline-earth, which as is conventional is expressed in terms of wt % of the oxides eg $(Na_2O+K_2O)/(CaO$ and MgO), is <1.

The mineral wool fibers are preferably bio-soluble; in particular, the mineral wool fibers preferably satisfy the requirements under Note Q of EU Directive 67/548/EEC for exemption from the classification, packaging and labelling provisions of that Directive.

The method of manufacturing mineral wool fibers comprises introducing mineral batch material(s) in to a melter, melting the mineral batch material(s) to provide a melt and fiberizing the melt to form the mineral wool fibers.

The first batch material may comprise:
52 to 62 wt % $SiO_2$, notably 52 to 56 wt % $SiO_2$, and
12 to 16 wt % $Al_2O_3$, and
16 to 25 wt % CaO, and
0 to 5 wt % MgO, and
0 to 10 wt % $B_2O_3$, notably 0 to 2 wt % $B_2O_3$, and
0 to 2 wt % of the combination of $Li_2O+Na_2O+K_2O$, and
0 to 1.5 wt % $TiO_2$, and
0.005 to 1 wt % total iron expressed as $Fe_2O_3$, and
0 to 1 wt % fluoride.

The quantity of $SiO_2$ in the first batch material may be ≥52 wt % and ≤56 wt %. The quantity of $SiO_2$ in the first batch material may be ≥54 wt %, ≥55 wt % or ≥56 wt % and/or ≤61 wt %, ≤60 wt %, or ≤58 wt %. The quantity of $Al_2O_3$ in the first batch material may be ≥12.5 wt % or ≥13 wt % and/or ≤15 wt % or ≤14 wt %. The quantity of CaO in the first batch material may be ≥20 wt % or ≥21 wt % and/or ≤24.5 wt % or ≤23 wt %. The quantity of MgO in the first batch material may be ≥0.5 wt % or ≥1 wt % and/or ≤5 wt % or ≤3 wt %. The quantity of total iron expressed as $Fe_2O_3$ in the first batch material may be ≥0.001 wt % or ≥0.05 wt % or ≥0.1 wt % and/or ≤0.6 wt %, or ≤0.5 wt %. The quantity of $B_2O_3$ in the first batch material may be: ≥5 wt % and ≤10 wt %; ≥4.5 wt % and ≤7.5 wt %; or ≥0.25 wt % and ≤3.5 wt %; or ≤0.05 wt %.

In one embodiment, the first batch material comprises
53 to 56 wt % $SiO_2$, and
12 to 16 wt % $Al_2O_3$, and
20 to 24 wt % CaO, and
0 to 2 wt % MgO, and
4 to 8 wt % $B_2O_3$ and
0.5 to 1.8 wt % of the combination of $Li_2O+Na_2O+K_2O$, and
0 to 0.5 wt % $TiO_2$, and
0.005 to 0.75 wt % total iron expressed as $Fe_2O_3$.

In another embodiment, the first batch material comprises
55 to 57 wt % $SiO_2$, and
12 to 15 wt % $Al_2O_3$, and
23 to 26 wt % CaO, and
1 to 4.5 wt % MgO, and
0.01 to 2.5 wt % $B_2O_3$ and
0.5 to 1.8 wt % of the combination of $Li_2O+Na_2O+K_2O$, and
0.01 to 1.5 wt % $TiO_2$, and
0.005 to 0.75 wt % total iron expressed as $Fe_2O_3$.

In a further embodiment, the first batch material comprises
58 to 62 wt % $SiO_2$, and
11.5 to 14.5 wt % $Al_2O_3$, and
20 to 24 wt % CaO, and
1.5 to 5 wt % MgO, and
0.01 to 2.5 wt % $B_2O_3$ and
0.5 to 1.8 wt % of the combination of $Li_2O+Na_2O+K_2O$, and
0.01 to 1.5 wt % $TiO_2$, and
0.005 to 0.75 wt % total iron expressed as $Fe_2O_3$.

The first batch material may comprise
52 to 62 wt %, notably 55 to 60 wt % $SiO_2$, and
21 to 30 wt %, notably 23 to 28 wt % $Al_2O_3$, and
6 to 17 wt %, notably 8 to 15 wt % CaO, and
2 to 9 wt %, notably 4 to 7 wt % MgO, and
0 to 1 wt %, notably 0 to 0.35 wt % $B_2O_3$ and
0 to 2 wt %, notably 0 to 1 wt % of the combination of $Na_2O+K_2O$, and
0 to 1 wt %, notably 0 to 0.5 wt % total iron expressed as $Fe_2O_3$, and
0 to 1 wt %, notably 0 to 0.3 wt % fluoride.

Alternatively, the first batch material may comprise
62 to 68 wt %, notably 64 to 66 wt % $SiO_2$, and
22 to 27 wt %, notably 24 to 25 wt % $Al_2O_3$, and
8 to 12 wt %, notably 9.5 to 10 wt % MgO, and
0 to 1 wt %, notably 0 to 0.2 wt % CaO, and
0 to 1 wt %, notably 0 to 0.2 wt % of the combination of $Na_2O+K_2O$, and
0 to 0.5 wt %, notably 0 to 0.1 wt % total iron expressed as $Fe_2O_3$.

The first batch material preferably has a composition which is significantly different from the composition of the mineral wool fibres. The first batch material may comprise:
a quantity of $SiO_2$ which is greater than that of the mineral wool fibers, notably by at least 10 percentage points; and/or
a quantity of $Al_2O_3$ which is less than that of the mineral wool fibers, notably by at least 2 percentage points; and/or
a quantity of CaO which is greater than that of the mineral wool fibers, notably by at least 2 percentage points; and/or
a quantity of MgO which is less than that of the mineral wool fibers, notably by at least 4 percentage points; and/or
a quantity of total iron expressed as $Fe_2O_3$ which is less than that of the mineral wool fibers, notably by at least 5 percentage points.

The first batch material may comprise fibers, notably fibers having: an average diameter which is ≥5 µm, ≥9 µm, ≥10 µm or ≥12 and/or ≤25 µm, ≤20 µm or ≤18 µm; and/or an average length which is ≥2 mm, ≥5 mm or ≥8 mm and/or ≤100 mm, ≤80 mm, ≤60 mm or ≤50 mm. Such fibers may be produced by crushing, chopping or milling fibers having a greater length, for example fibers having a length ≥30 cm or ≥50 cm. The length of such fibers may be reduced for example in a wheel mill or in a hammer mill. Such lengths of fibers facilitate handling and processing. Preferably, when introduced in to the melter such fibers have an average length which is ≥2 mm and/or ≤10 mm. Alternatively or additionally the first batch material may comprise cullet; the cullet may have a particle size such that at least 90 wt % of the cullet, preferably at least 95 wt % of the cullet has a maximum dimension ≤20 mm, preferably ≤15 mm and more preferably ≤10 mm.

The first batch material may comprise, consist essentially of, or consist of scrap, notably scrap from the manufacture of mineral fibers, and particularly scrap from the manufacture of mineral fibers having a different composition and/or purpose than the mineral wool fibers being manufactured. For example, the first batch material may comprise, consist essentially of, or consist of scrap fibers, notably non woven scrap fibers, resulting from manufacture of continuous fibers. Particularly in this case, the first batch material may comprise, consist essentially of, or consist of: fibers which have broken, for example at a bushing producing continuous fibers, and/or fibers which are unsuitable for incorporation into their originally intended product. The use of such scrap as a batch material as described herein avoids complex recycling processes and/or disposal of such scrap in landfills.

As used herein, the term "consist or consist essentially of" is intended to limit the scope of a statement or claim to the specified materials or steps and those that do not materially affect the basic and novel characteristic(s) of the invention.

Particularly when in the form of fibers, the first batch material may comprise an organic coating, size or binder, for example in the form of an aqueous solution or suspension, notably comprising a starch, an oil, an emulsion, polyvinyl acetate(s), polyester(s), epoxy(s), polyurethane(s), polyvinyl pyrrolidone(s), polyvinyl alcohol(s), silane(s), organo-functional silane(s) and combinations thereof. Such an organic coating, size or binder may be present in a quantity which is ≥0.5 wt % or ≥1 wt % and/or ≤10 wt % or ≤8 wt % with respect to the total weight of the first batch material.

Particularly when the melter is a submerged combustion melter, the water or moisture content in the first batch material when introduced in to the melter may be ≥2 wt %, ≥5 wt %, or ≥10 wt %; and/or ≤35 wt %, ≤25 wt %, ≤20 wt %, or ≤15 wt % based on the total weight of the first batch material; it may be between 10 and 25 wt %. The ability to use a batch material having a relatively high water or moisture content, notably ≥10 wt % allows the use of certain available materials notable without pre-treatment to reduce water content.

Particularly where the melter comprises a cupola furnace, the first batch material may be introduced in to the melter as a component of one or more briquettes, notably briquettes comprising fibers of the first batch material. The briquette may comprise between 10 and 25 wt % of cement, and/or between 5 and 25 wt % of granular materials and/or between 50 and 85 wt % of the first batch material, notably in the form of fibers. The briquette may comprise cement in a quantity that is ≥5 wt %, ≥10 wt %, ≥12 wt %, or ≥13 wt % and/or ≤35 wt %, ≤30 wt %, ≤25 wt %, or ≤20 wt %. The cement may be selected from the group consisting of Portland cement and alumina cement. The granular material may comprise mineral wool cullet, undersize raw material, undersize coke, igneous, metamorphic or sedimentary rocks, steel slag, siderite, iron ore, limonite fayalite rich olivine and combinations thereof. The briquette may comprise granular material in a quantity which is ≥2 wt %, ≥5 wt %, ≥10 wt %, ≥12 wt %, or ≥15 wt % and/or ≤35 wt %, ≤30 wt %, ≤25 wt %, or ≤20 wt %. The briquette may comprise the first batch material, notably in the form of fibers, in a quantity that is ≥40 wt %, ≥45 wt %, ≥50 wt %, ≥60 wt %, or ≥70 wt % and/or ≤90 wt %, ≤85 wt %, ≤80 wt %, or ≤75 wt %. The water or moisture content in the first batch material when introduced in to briquettes during their manufacture may be ≥2 wt %, ≥5 wt %, or ≥10 wt %; and/or ≤35 wt %, ≤25 wt %, ≤20 wt %, or ≤15 wt % based on the total weight of the first batch material; it may be between 10 and 25 wt %. The briquettes are preferably allowed to set or dry prior to introduction in to the melter, notably left to set or dry for a period which is ≥2 days or ≥3 days and/or ≤10 days or ≤6 days. The briquettes, notably when introduced in to the melter, may have a compressive strength that is ≥1.5 MPa, ≥2 MPa, ≥2.5 MPa, ≥3 MPa, or ≥3.5 MPa; and/or ≤15 MPa, ≤10 MPa, ≤7.5 MPa or ≤5 MPa, notably a compressive strength between 3 and 5 MPa. The briquettes may have a height that is greater than 3 cm, 4 cm, 5 cm, 6 cm, or 7 cm and/or less than 20 cm, 15 cm, 12 cm, or 10 cm; and a maximum dimension (width and/or depth) perpendicular to their height which is greater than 3 cm, 4 cm, 5 cm, 6 cm, or 7 cm and/or less than 20 cm, 15 cm, 12 cm, or 10 cm. The briquettes may be hexagonal in cross section perpendicular to its height. Where the mineral batch materials include briquettes, the briquettes may constitute ≥10 wt %, ≥15 wt %, ≥20 wt % or ≥25 wt %; and/or ≤80 wt %, ≤70 wt %, ≤60 wt %, or ≤50 wt % of the total mineral batch materials. In one particularly advantageous embodiment, first batch material in the form of fibers having a moisture content of at least 5 wt % and notably at least 10 wt % is mixed with one of more other components, notably cement, to form briquettes with the moisture content of the first batch material providing a portion of the water required to produce the briquettes.

The first batch material may constitute: ≥5 wt %, ≥10 wt %, ≥15 wt %, or ≥20 wt % and/or ≤70 wt %, ≤60 wt %, ≤50 wt %, ≤40 wt %≤30 wt %≤25 wt % of the total batch materials introduced in to the melter. The term "batch materials" as used herein comprises all materials, notably minerals, introduced in to the melter which provide any of the elements that will form part of the melt; the term excludes, notably: a) water (other than water of crystallization); b) organic compounds, for examples binders, which will decompose in the melter; and c) fuel and combustion gasses which serve to release energy to provide melting. It is particularly advantageous for the first batch material to constitute a significant portion of the total batch materials, notably at least 10 wt %.

Preferably, the batch materials also include a second batch material. The second batch material may comprise mineral wool fibers. Such mineral fibers may comprise
30 to 55 wt %; SiO$_2$, and
10 to 30 wt % Al$_2$O$_3$, and
20 to 35 wt % of the combination of CaO and MgO, and
4 to 14 wt % total iron expressed as Fe$_2$O$_3$, and
less than 8 wt % of the combination of Na$_2$O and K$_2$O, and preferably
an alkali/alkaline-earth ratio which is ≤1.
The quantity of SiO$_2$ in the second batch material may be ≥35 wt % or ≥38 wt %; and/or ≤50 wt %, or ≤45 wt %. The quantity of Al$_2$O$_3$ in the second batch material may be ≥15 wt % and/or ≤25 wt % or ≤20 wt %. The quantity of the combination of CaO and MgO in the second batch material may be ≥25 wt % and/or ≤30 wt %. The quantity of the combination of Na$_2$O and K$_2$O in the second batch material may be ≥1 wt % or ≥2 wt % or ≥4 wt %; and/or ≤5 wt % or ≤4 wt %. The total iron content expressed as Fe$_2$O$_3$ in the second batch material may be ≥5 wt % or ≥6 wt % and/or ≤12 wt % or ≤10 wt %.

Advantageously, the second batch material comprises a portion of the mineral wool fibers previously manufactured and recycled in the manufacturing process. Such fibers may comprise scrap, off-cuts and/or edge cuts of mineral wool insulation manufactured using the mineral wool fibers.

Particularly when in the form of fibers, the second batch material may comprise an organic coating, size or binder, for example in the form of an aqueous solution or suspension, notably comprising phenol formaldehyde, polyester(s), epoxy(s), silane(s), Maillard reactants, Maillard reactant products, organo-functional silane(s) and combinations thereof. Such an organic coating, size or binder may be present in a quantity which is ≥0.5 wt % or ≥0.1 wt % and/or ≤10 wt % or 8 wt % with respect to the total weight of the second batch material.

The second batch material may be processed before being introduced in to the melter, for example by crushing, chopping, milling, opening out or combinations thereof. The second batch material may be processed together with the first batch material. The second batch material may be introduced in to the melter as a component of one or more briquettes, notably briquettes having one of more of the features described above other than either a) the substitution of the second batch material for the first batch material in the briquettes or b) the substitution of a combination of the first and second batch materials for the first batch material in the briquettes. The second batch material may constitute: ≥5 wt %, ≥10 wt %, ≥15 wt %, or ≥20 wt % and/or ≤70 wt %, ≤60 wt %, ≤50 wt %, ≤40 wt %≤30 wt %≤25 wt % of the total batch materials introduced in to the melter.

The combination of the first and second batch materials may constitute: ≥40 wt %, ≥50 wt %, ≥60 wt %, or ≥70 wt % and/or ≤90 wt % or ≤80 wt % of the total batch materials introduced in to the melter.

One or more additional batch materials may be included, notably selected from the following and combinations thereof:

a batch material comprising ≥15 wt %, ≥20 wt % or ≥25 wt % total iron (expressed as Fe$_2$O$_3$), for example steel slag, fayalite rich olivine (Fe$_2$SiO$_4$), siderite (FeCO$_3$), limonite iron ore (FeO(OH).nH$_2$O) and combinations thereof notably in a quantity constituting a) ≥5 wt % or ≥8 wt % and/or ≤25 wt % or ≤20 wt % of the total batch materials introduced in to the melter and/or b) between 20% and 50% by weight with respect to the total quantity of the first batch material;

dolomite, notably constituting ≥4 wt % or ≥8 wt % and/or ≤30 wt % or ≤25 wt % of the total batch materials introduced in to the melter;

a batch material comprising ≥70 wt % Al or Al$_2$O$_3$, for example calcined bauxite, and/or natural bauxite or alumina cement, notably constituting ≥2 wt % or ≥3 wt % and/or ≤10 wt % or ≤8 wt % of the total batch materials introduced in to the melter;

a batch material comprising ≥35 wt % Al$_2$O$_3$, for example alumina cement, notably constituting ≥2 wt % or ≥3 wt % and/or ≤10 wt % or ≤8 wt % of the total batch materials introduced in to the melter.

Melting of the mineral batch materials may be carried out in a melter selected from a submerged combustion melter, a cupola furnace, an electric arc furnace and a circulating furnace.

Where the melter is a cupola furnace, coke may be used as the main energy source. The cupola furnace may comprise:

a first zone, referred to as the heating zone, with a temperature range 200-800° C. where raw materials are heated, lose moisture and flame-loss occurs. At 300-400° C., the indirect reduction of iron oxide starts.

a second zone, referred to as a zone of re-formation of the inserted materials, where the temperature varies from 800° C. to 1350° C., and where, when included in the batch, dolomite ($CaCO_3$, $MgCO_3$) decays and $CO_2$ is released and further reduction of iron oxide takes place.

a third generally thin zone where only the melting of the inserted materials occurs; and a fourth, coke burning zone.

Combustion air or oxygen enriched air may be supplied to positions within the furnace, notably by one or more nozzles. Raw materials in the zone above the nozzles melt and flow towards the bottom of the cupola where they are collected in a melt pool, the melt being allowed to flow out of the melt pool to be fiberized, notably through a siphon outlet. Reduced iron generally collects at the bottom of the furnace and is periodically removed, for example by tapping. Alternatively, the cupola furnace may comprise a gas fired cupola furnace.

Where the melter is an electric arc furnace the mineral batch materials may be directly exposed to an electric arc so that electrical current from electrodes passes through the batch material to provoke melting.

Where the melter is a circulating furnace the method may comprise injecting particulate fuel, particulate mineral batch material(s) and primary combustion gas in to a combustion chamber which contains circulating chamber gases, thereby melting the particulate mineral batch materials to form a mineral melt and generating exhaust gases, and separating the mineral melt from the hot exhaust gases so that the hot exhaust gases pass through an outlet in the circulating combustion chamber and the mineral melt collects in a base zone.

Where the melter is a submerged combustion melter the method may comprise introducing mineral batch material(s) into a melting chamber having one or more submerged combustion burners mounted in its floor and/or wall, the submerged combustion burners melting the batch material(s) by discharging combustion products under a level of material being melted in the melter and preferably creating turbulent conditions in the melter. The melter may be a submerged combustion melter as described in any of WO 2015/014921, WO 2015/014919, WO 2015/014920, WO 2016/120351 or WO 2016/120353, each of which is hereby incorporated by reference.

Fiberizing the melt to form the mineral wool fibers may comprise fiberizing the melt using a cascade spinner or using an internal spinner. When using a cascade spinner the melt may be dropped onto the external peripheral surface of a first rotor rotating about a substantially horizontal axis and be thrown in sequence on to the peripheral surface of each subsequent rotating rotor in the cascade. There are preferably four rotors in the cascade, each rotor rotating about a different substantially horizontal axis notably with each of the second, third and fourth rotors rotating in a direction opposite to the previous rotor in the cascade. Fibers are formed at the peripheral surface of the melt on one or more rotors, preferably on each rotor, and are carried by an airstream towards a collecting belt. When using an internal spinner, the melt is introduced into the interior of an internal spinner rotating about a substantially vertical axis, travels towards the interior surface of a peripheral wall of the spinner, passes through orifices in the peripheral wall of the spinner to form melt streams which are attenuated by blast air passing along or adjacent to the external side of the peripheral wall of the spinner to form mineral fibers.

According to a further aspect the present invention provides a method of manufacturing a mineral fiber thermal insulation product comprising the sequential steps of:
a) making mineral wool fibers from a melt, notably according to one or more of the aspects described herein;
b) spraying a binder solution, notably an aqueous binder solution, on to the mineral fibers;
c) collecting the mineral fibers to which the binder solution has been applied to form a blanket of mineral fibers; and
d) curing the binder by passing the blanket of mineral fibers through a curing oven.

Prior to curing, the mineral fibers to which the binder solution has been applied may be collected to form a primary blanket of mineral fibers which is subsequently folded over itself, for example using a pendulum mechanism, to produce a secondary blanket comprising superimposed layers of the primary blanket.

Wash water may be sprayed on to mineral fibers between their formation and their collection to form a blanket, at least a part of the wash water having been sprayed on mineral fibers and subsequently returned to a wash water system to be reused as wash water. The binder solution may comprise wash water. The solids content of the binder solution applied to the mineral fibers may be ≥10 wt % or ≥12 wt % and/or ≤20 wt % or ≤18 wt %. The term "dry weight of the binder solution" as used herein means the weight of all components of the binder solution other than any water that is present (whether in the form of liquid water or in the form of water of crystallization).

Preferably the binder solution does not comprise any added formaldehyde. It may be "substantially formaldehyde free", that is to say that it liberates less than 5 ppm formaldehyde as a result of drying and/or curing (or appropriate tests simulating drying and/or curing); more preferably it is "formaldehyde free", that is to say that it liberates less than 1 ppm formaldehyde in such conditions.

Alternatively, the binder solution may be a phenol formaldehyde binder solution, notably a urea extended phenol formaldehyde binder solution.

The binder solution may comprise reducing sugar(s), notably in a quantity which is a) ≥30%, ≥40%, ≥50%, ≥60%, ≥70% or ≥80% of the dry weight of the binder solution and/or b) ≤97% or ≤95% of the dry weight of the binder solution.

The reducing sugar reactant(s) may be selected from one or more: monosaccharide, monosaccharide in aldose or ketose form, disaccharide, polysaccharide, triose, tetrose, pentose, xylose, hexose, dextrose, fructose, heptose, high fructose corn syrup (HFCS), molasses, starch hydrolysate, cellulose hydrolysates, and mixtures thereof. The reducing sugar reactant(s) may have a dextrose equivalent of at least about 50, at least about 60, at least about 70, at least about 80 or at least about 90.

The binder solution may comprise nitrogen-containing reactant(s), notably in a quantity which is a) ≥2.5%, ≥5% or ≥10% of the dry weight of the binder solution and/or b)≤50%, ≤40%, ≤30% or ≤25% of the dry weight of the binder solution. The nitrogen-containing reactant(s) may be selected from one or more: $NH_3$, inorganic amine, organic amine comprising at least one primary amine group and/or salts thereof, inorganic and organic ammonium salt, ammonium sulfate, ammonium phosphate, diammonium phosphate, ammonium citrate, diamine, polyamine, primary polyamine (ie an organic compound having two or more primary amine groups ($-NH_2$)), 1,6-diaminohexane (hexamethylenediamine, HMDA), 1,5-di amino-2-methylpentane (2-methyl-pentamethylenediamine).

The binder solution may comprise, by dry weight, (i) ≥25%, ≥40%, ≥50% or ≥60% of the combination of: (a) reducing sugar reactant(s) and nitrogen-containing reactant(s) and/or (b) curable reaction product(s) of reducing sugar reactant(s) and nitrogen-containing reactant(s). The nitrogen-containing reactant(s) and the reducing sugar reactant(s) (or their reaction product(s)) may be Maillard reactants that react to form Maillard reaction products, notably melanoidins when cured. Curing of the binder composition may comprise or consist essentially of Maillard reaction(s). The cured binder composition may comprise melanoidin-containing and/or nitrogenous-containing polymer(s); The binder composition may comprise a binder composition as described in any of WO 2007/014236, WO 2009/019232, WO 2009/019235, WO 2011/138458, WO 2011/138459 or WO 2013/150123, each of which is hereby incorporated by reference. The binder composition may include ester and/or polyester compounds. The cured binder may comprise greater than 2% and/or less than 8% nitrogen by mass as determined by elemental analysis The curing temperature and time for the blanket of mineral wool fibers may be selected as a function of the product density and/or thickness. The curing oven may have a plurality of heating zones having temperatures within the range 200° C. to 350° C. (typically 230° C. to 300° C.). A thin, low density product (12 kg/m³ or less) may be cured by passing through the curing oven in as little as 20 seconds; a thick, high density product (80 kg/m³ or more) may require a passage of 15 minutes or more in the curing oven. The blanket of mineral wool fibers may reach a temperature in the range 180° C.-220° C. during the curing process. The duration of passage of the blanket through the curing oven may be ≥0.5 minutes, ≥1 minute, ≥2 minutes, ≥5 minutes or ≥10 minutes and/or ≤50 minutes, ≤40 minutes or ≤30 minutes.

The quantity of cured binder in the cured blanket of mineral wool fibers may be ≥1%, ≥2%, ≥2.5%, ≥3%, ≥3.5% or ≥4% and/or ≤10% or ≤8%. This may be measured by loss on ignition (LOI).

The cured blanket of mineral wool fibers may have one or more of the following features:
a density greater than 15, 20 or 25 kg/m³ and/or less than 220, 200 or 180 kg/m³;
a thermal conductivity λ measured at 10° C. which is ≤40 mW/m·K and/or ≥20 mW/m·K, notably when measured in accordance with ISO 8301;
comprise less than 99% by weight and/or more than 80% by weight mineral fibers;
a thickness of greater than 10 mm, 15 mm or 20 mm and/or less than 400 mm, 350 mm or 300 mm;
a length which is ≥90 cm, ≥120 cm, ≥150 cm and/or ≤220 cm or ≤180 cm;
a width which is ≥50 cm, ≥70 cm and/or ≤100 cm or ≤90 cm.

In accordance with a further aspect, the present invention provides a method of making mineral wool fibers comprising:
30 to 55 wt %; $SiO_2$, and
10 to 30 wt % $Al_2O_3$, and
4 to 14 wt % total iron expressed as $Fe_2O_3$, and
either a) 20 to 35 wt % of the combination of CaO and MgO; and less than 8 wt % of the combination of $Na_2O$ and $K_2O$,
or b) 8 to 23 wt % of the combination of CaO and MgO; and 4 to 24 wt % of the combination of $Na_2O$ and $K_2O$;

the method comprising:
introducing mineral batch materials in to a melter, melting the mineral batch materials to provide a melt and fiberizing the melt to form the mineral wool fibers, wherein the mineral batch materials introduced in to the melter comprises a first batch material selected from:
a) a first batch material comprising
61 to 74 wt %, notably 63 to 72 wt % $SiO_2$, and
0 to 8 wt %, notably 0 to 6 wt % $Al_2O_3$, and
4 to 12 wt %, notably 6 to 10 wt % CaO, and
0 to 6 wt %, notably 0 to 4 wt % MgO, and
0 to 8 wt %, notably 0 to 6 wt % $B_2O_3$ and
12 to 18 wt %, notably 14 to 16 wt % of the combination of $Na_2O+K_2O$, and
0 to 2 wt %, notably 0 to 1 wt % $TiO_2$, and
0 to 1 wt %, notably 0 to 0.5 wt % total iron expressed as $Fe_2O_3$, and
0 to 1 wt %, notably 0 to 0.4 wt % fluoride.
and
b) a first batch material comprising:
53 to 77 wt %, notably 55 to 75 wt % $SiO_2$, and
0 to 7 wt %, notably 0 to 5 wt % $Al_2O_3$, and
0 to 12 wt %, notably 1 to 10 wt % CaO, and
0 to 3 wt %, notably 0 to 1.5 wt % $LiO_2$, and
0 to 10 wt %, notably 0 to 8 wt % $B_2O_3$ and
9 to 23 wt %, notably 11 to 21 wt % of the combination of $Na_2O+K_2O$, and
0 to 14 wt %, notably 0 to 12 wt % $TiO_2$, and
0 to 20 wt %, notably 1 to 18 wt % $ZrO_2$,
0 to 7 wt %, notably 0 to 5 wt % total iron expressed as $Fe_2O_3$, and
0 to 7 wt %, notably 0 to 5 wt % fluoride.

EXAMPLES

Embodiments of the invention will now be described by way of example only.

Example 1

The following mineral batch materials were melted in a laboratory melter:
27 wt % of a first batch material in the form of fibers;
50 wt % of a second batch material in the form of fibers;
10 wt % crushed dolomite (batch material 3);
9 wt % crushed steel slag (batch material 4);
4 wt % crushed calcined bauxite (batch material 5);
where
a) the wt % above is expressed in relation to the total weight of the combination of all of the mineral batch materials;
b) the first batch material consisted of about: 60.1 wt % $SiO_2$, 13.2 wt % $Al_2O_3$, 22.1 wt % CaO, 3.1 wt % MgO, less than 0.1 wt % $B_2O_3$, less than 0.1 wt % $Li_2O$, 0.9 wt % $Na_2O$, less than 0.1 wt % $K_2O$, 0.5 wt % $TiO_2$, and less than 0.1 wt % total iron expressed as $Fe_2O_3$;
c) the second batch material consisted of about: 40.2 wt %; $SiO_2$, 17.3 wt % $Al_2O_3$, 18.5 wt % CaO, 10.6 wt % MgO, 7.8 wt % total iron expressed as $Fe_2O_3$, 2.1 wt % $Na_2O$, 0.8 wt % $K_2O$, 1.5 wt % $TiO_2$ and 0.2 wt % $P_2O_3$.

The batch materials were sequentially: dried at 105° C.; crushed in a vibratory mill; mixed in a rotary mixer; and melted in an electric furnace at 1450° C. for 4 hours in alumina crucibles.

The composition of the melt produced comprised about: 41.3 wt % $SiO_2$, 18.8 wt % $Al_2O_3$, 21.5 wt % CaO, 9.1 wt % MgO, 6.2 wt % total iron expressed as $Fe_2O_3$, 1.5 wt % $Na_2O$, 0.5 wt % $K_2O$, 1.2 wt % $TiO_2$ and 0.1 wt % $P_2O_3$. It had a log 3 viscosity permitting fiberization on a cascade spinner and a bio-solubility satisfying the requirements of Note Q.

The first batch material had a composition significantly different from the composition of the melt produced. For example, the first batch material had:

a quantity of $SiO_2$ which was greater than that of the melt produced by 18.8 percentage points (ie 60.1 wt % minus 41.3 wt %;);

a quantity of $Al_2O_3$ which was less than that of the melt produced by 5.6 percentage points (ie 18.8 wt % minus 13.2 wt %);

a quantity of CaO which was greater than that of the melt produced by 0.6 percentage points (ie 22.1 wt % minus 21.5 wt %);

a quantity of MgO which was less than that of the melt produced by 6 percentage points (ie 9.1 wt % minus 3.1 wt %); and a quantity of total iron expressed as $Fe_2O_3$ which was less than that of the melt produced by 6.1 percentage points (ie 6.2 wt % minus 0.1 wt %).

Example 2

A melt having the following composition: 52.0 wt % $SiO_2$, 15.1 wt % $Al_2O_3$, 13.0 wt % CaO, 6.0 wt % MgO, 1.6 wt % $TiO_2$, 7.4 wt % total iron expressed as $Fe_2O_3$, 2.6 wt % $Na_2O$, 1.5 wt % $K_2O$, 0.4 wt % F, 0.1 wt % $Mn_2O_3$ and 0.4 wt % $P_2O_5$, and which is suitable for fiberizing may be obtained by melting the following quantity of batch materials, notably in a submerged combustion melter:

40 wt % of scrap fibers (batch material 1);
2 wt % steel slag (batch material 2);
58 wt % basalt (batch material 3);

wherein Table 1 below give the composition of the batch materials in wt %. The quantities in Table 1 are expressed when fully calcined; the loss represents primarily decarboxylation of calcinates and loss of water of crystallization.

TABLE 1 composition of batch materials in wt%

| | $SiO_2$ | $Al_2O_3$ | CaO | MgO | $TiO_2$ | $Fe_2O_3$ | $Na_2O$ | $K_2O$ | F | $Mn_2O_3$ | $P_2O_5$ | Loss |
|---|---|---|---|---|---|---|---|---|---|---|---|---|
| Batch material 1 Scrap fibers | 59.5 | 15.0 | 18.0 | 3.0 | 1.0 | 0.5 | 1.5 | 0.5 | 1.0 | | | |
| Batch material 2 Steel slag | 11.3 | 5.3 | 22.8 | 5.6 | | 47.2 | | | | 6.7 | 0.6 | 0.5 |
| Batch material 3 Basalt | 48.1 | 15.4 | 9.2 | 8 | 2.1 | 10.7 | 3.4 | 2.2 | | | 0.7 | 0.2 |

As it can be seen, the first batch material has a composition significantly different from the composition of the melt or mineral fibers produced.

The invention claimed is:

1. A method of making mineral wool fibers,
wherein the mineral wool fibers comprise:
30 to 55 wt % $SiO_2$, and
10 to 30 wt % $Al_2O_3$, and
4 to 14 wt % total iron expressed as $Fe_2O_3$, and
either a) 20 to 35 wt % of the combination of CaO and MgO; and less than 8 wt % of the combination of $Na_2O$ and $K_2O$; or b) 8 to 23 wt % of the combination of CaO and MgO;
and 4 to 24 wt % of the combination of $Na_2O$ and $K_2O$;
the method comprising:
introducing mineral batch materials in to a melter, melting the mineral batch materials to provide a melt and fiberizing the melt to form the mineral wool fibers,
wherein the mineral batch materials introduced in to the melter comprise a first batch material and one or more further batch materials, wherein the first batch material comprises:
52 to 68 wt % $SiO_2$, and
12 to 30 wt % $Al_2O_3$, and
0 to 25 wt % CaO, and
0 to 12 wt % MgO, and
0 to 10 wt % $B_2O_3$, and
0 to 2 wt % of the combination of $Li_2O+Na_2O+K_2O$, and
0 to 1.5 wt % $TiO_2$, and
0.05 to 1 wt % total iron expressed as $Fe_2O_3$, and
0 to 1 wt % fluoride;
spraying an aqueous binder solution to coat the mineral wool fibers while the mineral wool fibers are being carried in an air stream;
collecting the binder coated mineral wool fibers to form a blanket of mineral wool fibers; and
curing the aqueous binder solution by passing the blanket of mineral wool fibers through a curing oven.

2. A method in accordance with claim 1, wherein the first batch material comprises:
52 to 62 wt % $SiO_2$, and
12 to 16 wt % $Al_2O_3$, and
16 to 25 wt % CaO, and
0 to 5 wt % MgO, and
0 to 10 wt % $B_2O_3$, and
0 to 2 wt % of the combination of $Li_2O+Na_2O+K_2O$, and
0 to 1.5 wt % $TiO_2$, and
0.05 to 1 wt % total iron expressed as $Fe_2O_3$, and
0 to 1 wt % fluoride.

3. A method in accordance with claim 1, wherein the first batch material comprises fibers present in a quantity of at least 2 wt % with respect to the total weight of the first batch material.

4. A method in accordance with claim 1, wherein the first batch material comprises less than 0.01 wt % $B_2O_3$.

5. A method in accordance with claim 1, wherein the first batch material constitutes between 10 to 60 wt % of the mineral batch materials.

6. A method in accordance with claim 1, wherein the melter is selected from a submerged combustion melter, a cupola furnace, an electric arc furnace and a circulating furnace.

7. A method in accordance with claim 1, wherein the first batch material comprises loose fibers.

8. A method in accordance with claim 7, wherein the moisture content of the first batch material when introduced in to the melter is at least 10 wt %.

9. A method in accordance with claim 1, wherein the first batch material comprises briquettes comprising fibers of the first batch material.

10. A method in accordance with claim 1, wherein the first batch material comprises fibers derived from the manufacture of continuous fibers.

11. A method in accordance with claim 1, wherein the one or more further batch materials comprises a second batch material comprising fibers comprising:
   30 to 55 wt % $SiO_2$, and
   10 to 30 wt % $Al_2O_3$, and
   20 to 35 wt % of the combination of CaO and MgO, and
   4 to 10 wt % total iron expressed as $Fe_2O_3$, and
   less than 8 wt % of the combination of $Na_2O$ and $K_2O$, and
   an alkali/alkaline-earth ratio which is <1.

12. A method in accordance with claim 1, wherein the one or more further batch materials comprise batch materials selected from: dolomite, calcined bauxite, steel slag and combinations thereof.

13. A method in accordance with claim 1, in which the batch materials comprise recycled portions of the mineral wool insulation product.

14. A method in accordance with claim 2, wherein the first batch material comprises: 52 to 56 wt % $SiO_2$.

15. A method in accordance with claim 1, wherein the first batch material comprises 0 to 2 wt % $B_2O_3$.

16. A method in accordance with claim 1, wherein the first batch material comprises fibers which comprise an organic coating.

17. A method in accordance with claim 1, wherein the first batch material comprises fibers which comprise an organic coating present in a quantity of at least 2 wt % with respect to the total weight of the first batch material.

18. A method in accordance with claim 1, in which the batch materials comprise recycled portions of the mineral wool insulation product selected from edge trim and scrap.

* * * * *